United States Patent
Remond et al.

(10) Patent No.: US 6,892,808 B2
(45) Date of Patent: May 17, 2005

(54) REGULATION OF THE TEMPERATURE, THE SPEED AND THE DISTRIBUTION OF THE AIR BLOWN INTO A MOTOR-VEHICLE PASSENGER COMPARTMENT

(75) Inventors: Bernard Remond, Cesson (FR); Michel Schwob, Chatou (FR); Atallah Benalia, Romainville (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/799,101

(22) Filed: Mar. 6, 2001

(65) Prior Publication Data

US 2002/0125334 A1 Sep. 12, 2002

(30) Foreign Application Priority Data

Mar. 7, 2000 (FR) ............................................. 00 02917

(51) Int. Cl.[7] ............................ B60H 1/00; G05D 23/00
(52) U.S. Cl. ........................ 165/203; 165/271; 165/288; 237/2 A; 237/12.3 A; 236/91 C
(58) Field of Search ................................ 165/41, 42, 43, 165/44, 203, 271, 288; 237/2 A, 12.3 A, 12.3 B; 236/91 C, 49.3

(56) References Cited

U.S. PATENT DOCUMENTS

| | | | | |
|---|---|---|---|---|
| 4,694,798 A | * | 9/1987 | Kato et al. .............. | 165/271 X |
| 4,930,698 A | | 6/1990 | Takekawa et al. ........ | 165/43 X |
| 5,117,643 A | * | 6/1992 | Sakurai et al. .......... | 165/271 X |
| 5,878,809 A | * | 3/1999 | Heinle ...................... | 165/42 X |
| 6,269,872 B1 | * | 8/2001 | Anderson .................. | 165/271 |
| 6,360,958 B1 | * | 3/2002 | Ito et al. .................... | 237/2 A |

FOREIGN PATENT DOCUMENTS

| | | |
|---|---|---|
| EP | 0968855 | 1/2000 |
| FR | 2779097 | 12/1999 |

* cited by examiner

*Primary Examiner*—Ljiljana Ciric
(74) *Attorney, Agent, or Firm*—Liniak, Berenato & White

(57) ABSTRACT

A device to control an installation for heating, ventilating and/or ai-conditioning a vehicle passenger compartment responds to a set-point set by a passenger and chosen air-heating parameter values. A control module drives actuators to modify the operation of the installation. The device includes a module calculating a comfort temperature for a passenger in the passenger compartment using the stored values of the chosen parameters and by taking into account the set-point. The control module alters the operation of the installation as a function of the comfort temperature which corresponds to the air-heating configuration desired in the passenger compartment.

20 Claims, 5 Drawing Sheets

REGULATION OF THE TEMPERATURE, THE SPEED AND THE DISTRIBUTION OF THE AIR BLOWN INTO A MOTOR-VEHICLE PASSENGER COMPARTMENT

FIELD OF THE INVENTION

The invention relates to a device for control of an installation for heating, ventilating and/or air-conditioning a motor-vehicle passenger compartment.

BACKGROUND OF THE INVENTION

A device of this type is usually equipped with a control module in order to manage the operation of at least one item of equipment of the installation, for example a blower producing an airflow blown into the passenger compartment, or else a heating radiator for increasing the temperature of this airflow.

Hence, such a control module acts on an actuator for setting up the equipment in order to adjust the temperature and/or the speed of the airflow which the installation delivers, if appropriate as a function of a set-point value which a passenger of the passenger compartment supplies. This set-point value, relating to an air-heating configuration desired by the passenger, is generally issued by way of a control element available to the passenger.

In a control device of the abovementioned type, the control module works with a regulation module suitable for interpreting a variation of the set-point value and/or a variation in an air-heating parameter in the passenger compartment. The control module then acts on the setting actuator in order to modify the temperature and/or the speed of the airflow delivered, as a function of the abovementioned variations.

In the known control devices, variations in the air-heating parameters are estimated on the basis of measurements giving access to the temperature and to the speed of air blown into the passenger compartment. In fact, it is conventionally agreed that an estimate of the temperature and/or of the speed of blown air make it possible, in themselves, to define the comfort likely to be felt by a passenger of the vehicle. However, in a motor-vehicle passenger compartment, the heat sensed by a passenger depends, certainly, on the blown-air temperature, but also on its speed, as well as other parameters, such as solar or other radiation.

However, regulation is currently desirable which can take account directly of the thermal comfort which the passengers actually feel.

The present invention aims to improve the situation.

SUMMARY OF THE INVENTION

It relates to a control device, of the type comprising:
 at least one input for receiving at least one signal representative of information relating to a chosen air-heating parameter,
 an output linked to at least one actuator for setting equipment of the installation, and
 a control module connected to the said output and capable of driving the setting actuator with a view to modifying the operation of the equipment.

According to a general definition of the invention, the device includes a calculating module able to evaluate at least one comfort temperature for a passenger of the passenger compartment, on the basis of the air-heating parameter and of chosen models, as will be seen later on. The control module is then configured to work with the calculating module with a view to modifying or not modifying the operation of the equipment as a function of this evaluation of the comfort temperature, which advantageously corresponds to a desired air-heating configuration in the passenger compartment.

By "comfort temperature" (or, below, "equivalent temperature") is understood a temperature equivalent to a temperature considered to be uniform in a virtual environment where the forced speed of the air would be zero. It is estimated that a passenger, in this environment, exchanges the same amount of heat by natural convection as the amount of heat which he would exchange by conduction, by convection and by radiation in a real environment. Thus, the comfort temperature makes it possible, as appropriate, to model the combined effects of a blown-air temperature, of a blown-air speed and of an average radiant temperature.

The present invention then proposes an application of the evaluation of such a temperature to the thermal comfort of a passenger in a motor-vehicle passenger compartment.

The device preferably comprises:
 a first input, suitable for receiving a set-point value relating to a desired air-heating configuration in the passenger compartment, and
 a second input, for receiving at least the abovementioned signal, representative of information relating to the chosen air-heating parameter, while the calculating module is able to evaluate the comfort temperature on the basis of the air-heating parameter and advantageously while taking account of this set-point value.

The device preferably includes a memory for storing the set-point value. The second input is linked to this memory in order furthermore to store a value representative of the air-heating parameter. The calculating module then works with the memory in order to evaluate the comfort temperature.

In one preferred embodiment, the memory, in return, works with the calculating module in order to store the evaluated comfort temperature. The calculating module is configured to estimate a variation between an evaluated comfort temperature and a memory-stored comfort temperature. The control module then adjusts (or does not adjust) the operation of the equipment as a function of the estimated variation in the comfort temperature, with a view to maintaining a desired air-heating configuration in the passenger compartment.

In one variant, the calculating module works with the memory and the first and/or the second input in order to estimate a variation in the air-heating parameter and/or in order to take account of a variation in the set-point value received. The control module is configured to adjust or not adjust the operation of the equipment as a function of at least one estimated variation in the air-heating parameter and/or of the set-point value received, with a view to maintaining a comfort temperature which corresponds to the last-received set-point value of desired air-heating configuration in the passenger compartment.

In another variant, the calculating module dynamically evaluates the comfort temperature and the control module can dynamically alter the operation of the abovementioned equipment, as a function of the currently evaluated comfort temperature. This embodiment advantageously makes it possible to dispense with a memory for successively recording the set-point values received and/or the measured air-heating parameter values.

In order to evaluate the comfort temperature, the calculating module is advantageously capable of establishing a thermal budget, specific to the passenger compartment of the vehicle, involving exchanges by convection, by radiation and by conduction, as appropriate (for example with the passenger's seat).

Exchanges by radiation relate, for example, to exchanges with the structure of the vehicle, the windows or otherwise, and vary especially with the outside temperature and, if appropriate, with solar flux incident on the vehicle. Furthermore, the average temperature within the passenger compartment is one of the parameters which plays a part in examining exchanges by radiation in order to evaluate the comfort temperature.

Advantageously, the second input of the device according to the invention is suitable for receiving at least one piece of information representative of an average interior temperature in the passenger compartment, and the calculating module is configured to estimate the comfort temperature as a function of the interior temperature.

Here, and in what follows, "information representing a parameter" means information which can be deduced directly from measurements of this parameter on the basis of at least one sensor, or else information which can be calculated on the basis of chosen models involving this parameter (thermal budgets, aerodynamic models, etc.), as will be seen in detail later on.

Exchanges by convection relate to exchanges with an airflow blown into a predetermined region of the passenger compartment. The parameters of this flow, such as its temperature and its speed, play a part in this context in estimating the comfort temperature.

Hence, according to another important characteristic of the invention, the second input is suitable for receiving respective signals representative of an air temperature and speed which are local to a predetermined region of the passenger compartment, while the calculating module is configured to estimate the comfort temperature for a passenger situated in this predetermined region.

The various parameters such as the average interior temperature and the local temperature and speed, can be measured directly by sensors linked to the second input of the device according to the invention. However, such sensors would be expensive or their use would be an intricate matter. For example, an average-temperature sensor might require its own constant ventilation. Moreover, local temperature or speed sensors would have to be practically in contact with the skin or the clothing of the passenger.

In one particularly advantageous embodiment, the second input is suitable for receiving respective signals representative of a temperature and of a speed of the air which the installation blows in.

The calculating module is then configured to estimate the abovementioned local air temperature and speed, advantageously according to a chosen aerodynamic model of the passenger compartment, this aerodynamic model involving the temperature and the speed of the air blown in by the installation.

Such an aerodynamic model, applied to the passenger compartment of a motor vehicle, is described at least in part in the French patent application FR-2779097 of the Applicant.

Advantageously, the calculating module is moreover configured to evaluate the average interior temperature in the passenger compartment as a function of the temperature and of the speed of the blown air, according to a chosen thermal model of the passenger compartment.

A thermal model of this type, thus one applied to the passenger compartment of a motor vehicle is, at least partly, also described in the abovementioned application FR-2779097 of the Applicant.

The use of such aerodynamic and thermal models makes it possible, as will be seen later on, to reduce the number of sensors to be provided and their connection to the second abovementioned input of the device according to the invention.

The second input is preferably suitable for receiving, furthermore, a signal representative of an outside-air temperature, and the calculating module is configured to take account of the outside-air temperature in the thermal model of the passenger compartment, with a view to estimating the average interior temperature.

In a variant, or in supplement, according to a more developed embodiment, the second input is suitable moreover for receiving a signal representative of solar flux incident on the vehicle, and the calculating module is configured to take account, moreover, of the solar flux in the thermal model of the passenger compartment, with a view to evaluating the average interior temperature.

According to one advantageous, optional characteristic, the second input is suitable moreover for receiving a signal representative of the temperature of at least one window and/or of the structure of the vehicle, and the calculating module is configured to evaluate the comfort temperature as a function of the window and/or structure temperatures.

Advantageously, the calculating module is configured to evaluate the window and/or structure temperatures as a function of the temperature and of the speed of the blown air, preferably by taking account, moreover, of the outside temperature and/or of the solar flux.

Such a preferred embodiment advantageously makes it possible to dispense with temperature sensors provided on the structure or on a window of the vehicle.

In order to evaluate the speed of air blown in by the installation, the second input can advantageously receive respective signals representative:

of an airspeed outside the passenger compartment, deduced, for example, from the speed of the vehicle, of a rotational speed of a blower of the installation, which delivers an airflow and which is generally controlled electrically, and of a position of one or more flaps for distributing the airflow in the passenger compartment.

The calculating module is then configured to deduce the blown-air speed as a function of the outside-air speed, of the rotational speed of the blower and of the position of the distribution flap, according to a chosen aerodynamic model, specific to the installation.

It is sufficient, if appropriate, to provide a connection from the second input to:

a speed sensor or a speed counter, provided in a conventional way on motor vehicles, an actuator for setting up the blower for receiving an electric control signal (in terms of current, or more conventionally, in terms of voltage), this signal being representative of the rotational speed of the blower, and an actuator for setting the position of the abovementioned flap, which can be controlled electrically by a current or a voltage.

In order to evaluate a blown-air temperature, the second input is advantageously suitable for receiving signals representative:

of a blown-air speed, which can be deduced from the abovementioned aerodynamic model, specific to the installation, of a hot-air temperature which a hot-air source of the installation delivers, especially a heating radiator, in the case in which the installation can provide air-conditioning of the passenger compartment, of a cold-air temperature which a cold-air source of the installation delivers, especially an evaporator of an air-conditioning loop, and of an outside-air temperature.

Advantageously, the calculating module is configured to evaluate the blown-air temperature as a function of the blown-air speed, of the hot-air and/or cold-air temperatures, and of the outside-air temperature, according to a chosen thermal model specific to the installation.

Finally, in order to provide regulation of the comfort temperature, in the device according to the invention, it is possible to provide only one outside-temperature sensor, which is currently found in present-day vehicles, a speed sensor and, in one advanced, optional variant, a solar-flux sensor.

Thus, the operation of a control device, in the sense of the present invention, can be defined by the following stages:

a) receiving and, preferably, storing in memory a set-point value originating from a passenger of the passenger compartment, and relating to a desired air-heating configuration, b) receiving and, preferably, storing in memory at least one value representative of a chosen air-heating parameter, such as an outside-air temperature, a speed of the vehicle or a solar flux incident on the vehicle, c) estimating, according to aerodynamic and thermal models specific to the installation, a temperature and a speed of air which the installation blows into the passenger compartment, as a function of the settings of the installation and, as appropriate, as a function of the speed of the vehicle and/or of the outside temperature, d) evaluating, according to a thermal model of the passenger compartment, an average temperature within the passenger compartment, on the basis of the temperature and of the speed of blown air and especially on the basis of the outside temperature and/or of the solar flux, e) evaluating, according to this thermal model, a temperature of the structure and/or of at least one window of the vehicle, on the basis of the temperature and of the speed of blown air and especially on the basis of the outside temperature and/or of the solar flux, f) evaluating, according to an aerodynamic model of the passenger compartment, a temperature and a speed of local air where the passenger is situated, on the basis of the temperature and of the speed of blown air, as well as of the average interior temperature, g) evaluating a comfort temperature for the passenger, as a function of the local air temperature and speed, of the average interior temperature and, if appropriate, of the temperature of the structure and/or of the windows of the vehicle, stage e) being optional.

That being so, the present invention also envisages a method including all or part of the above stages.

BRIEF DESCRIPTION OF THE DRAWINGS

Other characteristics and advantages of the invention will emerge on examining the detailed description below, and the attached drawings, in which.

DESCRIPTION OF THE PREFERRED EMBODIMENTS

Figure 1:
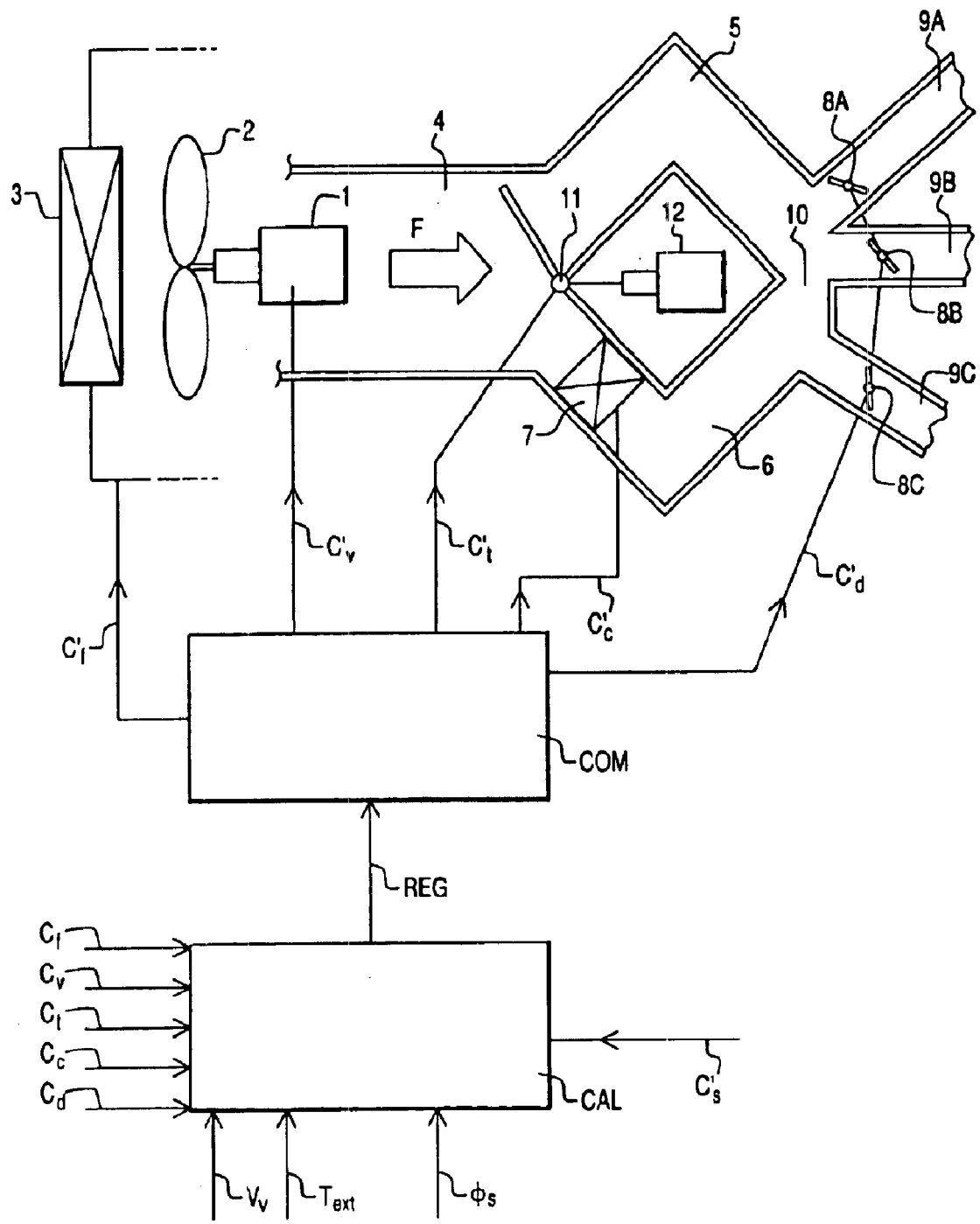
FIG. 1 diagrammatically represents an installation for heating, ventilating and air-conditioning the passenger compartment of a motor vehicle, equipped with a control device according to a preferred embodiment of the present invention.

The description below and the attached drawings contain, in essence, elements of a certain character. They can serve not only to give a better understanding of the invention, but also contribute to its definition, as appropriate.

In the various figures, like reference numerals indicate like parts.

Referring first of all to FIG. 1, an installation is described for heating, ventilating and air-conditioning the passenger compartment of a motor vehicle, controlled by a device according to the invention.

The installation first of all comprises a blower equipped with a motor 1 and with fan blades 2, mounted on the shaft of the motor 1. The blades of the fan, in rotation, produce an airflow F, intended to be blown into the passenger compartment of the vehicle. In practice, the motor 1 of the blower is powered electrically, preferably in terms of voltage. Hence, when the voltage at the terminals of the motor of the blower rises, the airflow delivered F increases, which leads to an increase in the speed Vas of air blown into the passenger compartment of the vehicle, in a general way.

This airflow F is routed into a main duct 4 of the installation, which is divided, downstream, into a cold-air branch 5 and a hot-air branch 6, in the example described. The hot-air branch 6 comprises a heating radiator 7, suitable for working with a part of the airflow F which passes through the hot-air branch 6, with a view to increasing the temperature of this part of the flow.

At the separation between the cold-air 5 and hot-air 6 branches, a mixing flap 11 is provided, in the example represented, capable of being moved (in rotation in the example represented in FIG. 1) from a position for closing the cold-air branch 5 and for opening the hot-air branch 6, to a position for closing the hot-air branch 6 and for opening the cold-air branch 5. The two hot-air 6 and cold-air 5 branches join together, downstream, in a mixing chamber 10.

Thus, the temperature of the air blown into the mixing chamber 10 is adjusted as a function of the position of the mixing flap 11.

In the example described, a motor 12 is provided for moving the mixing flap 11. The electrical power supply to this motor 12 thus defines the position of the mixing flap 11 and, that being so, a temperature Tas of the airflow blown into the mixing chamber 10.

In one variant of the embodiment represented in FIG. 1, the mixing flap 11 can be dispensed with, while a heating radiator, of adjustable heat capacity, is interposed in the main duct 4 in order to heat up the main airflow which the blower of the installation delivers. In this variant, a heat-exchange fluid (generally water) runs through the heating radiator and thus gives up its heat to the airflow F which passes through the radiator. In general, the throughput of the heat-exchange fluid in the radiator makes it possible to define the temperature of the airflow F which is intended to be blown into the passenger compartment. The throughput of this fluid is controlled by a supply valve of the heating radiator.

Provision can be made, moreover, for an additional heating radiator, generally electrically controlled, and including a plurality of positive-temperature-coefficient resistance elements. In the example described, the temperature Tc of the part of the airflow which flows in the hot-air branch 6 can be adjusted by means of such an additional heating radiator (not represented), housed in this hot-air branch 6, or else by providing a heating radiator 7 traversed by a fluid with adjustable throughput and housed in the hot-air branch 6.

The installation further includes an air-conditioning loop equipped with an evaporator 3 placed, in the example described, upstream of the blower of the installation. When the motor of the blower is powered with electricity, an airflow is created, passing through the evaporator 3. In practice, the evaporator 3 is traversed by a cooling fluid the pressure of which, in this air-conditioning loop, is variable, with a view to controlling the cooling capacity of the evaporator 3 and, that being so, the temperature Tf of the air which passes through it.

Thus, the temperature Tas in the mixing chamber 10 of the installation depends:
 on the temperature Tf of the airflow leaving the evaporator 3,
 on the temperature Tc of the part of the airflow in the hot-air branch 6, and
 on the position of the mixing flap 11.

The temperature of the airflow leaving the evaporator 3 depends on the pressure of the cooling fluid in the air-conditioning loop. In order to evaluate this temperature Tf, provision can be made to directly arrange a temperature sensor immediately downstream of the evaporator 3. In a variant, provision can be made to arrange a pressure sensor in a chosen part of the air-conditioning loop. The cooling capacity of the loop can be deduced from the pressure of the cooling fluid. In the case in which this air-conditioning loop is equipped with an external-control compressor (electronic valve supplied with current), this small pressure may itself be deduced from the electrical power-supply current of the compressor. Conversely, the temperature of the airflow leaving the evaporator 3 can be controlled by controlling the pressure of the cooling fluid in the loop and, if appropriate, by adjusting the electrical power-supply current of the compressor of this loop.

The temperature Tc of the part of the airflow which flows in the hot-air branch 6 can be deduced from a temperature sensor fitted into this branch 6. In a variant, it can be deduced from the throughput of heat-exchange fluid which flows in the heating radiator 7, in particular from the adjustment of its supply valve, or else from the electrical current for supplying power to the resistance elements of an additional heating radiator, as appropriate.

On the basis of the temperatures of the air leaving the cold source (evaporator 3), of the hot source (hot-air branch 6) and of the position of the mixing flap 11, access is finally available to the temperature of the air in the mixing chamber 10.

The mixing chamber 10 is itself separated into a plurality of ducts for supplying the passenger compartment of the motor vehicle. In the example described, the duct 9A which can be closed off by a distribution flap 8A, allows aeration of the windscreen of the vehicle. The duct 9B, which can be closed off by a distribution flap 8B, allows aeration of the passengers' chest area. A duct 9C, which can be closed off by a distribution flap 8C, allows aeration of a lower region of the passenger compartment, in practice of the passengers' feet.

The distribution flaps 8A, 8B and 8C are each shifted from a position for opening their respective duct to a closing position. Their position is generally controlled by at least one electric motor, the power supply to which makes it possible to deduce the respective positions of these flaps.

The device according to the invention comprises a calculating module CAL, comprising several inputs, through which it receives:
 a set-point value C's originating from a passenger in the passenger compartment of the vehicle;
 a signal representative of a speed of the motor vehicle Vv;
 a signal representative of a temperature Text of the air outside the vehicle; and
 preferably, a signal representative of solar flux incident on the vehicle Φs.

A control element (not represented) is conventionally provided, arranged on a dashboard of the passenger compartment, or else on the instrument panel, available to a passenger. Thus, the passenger actuates this control element and sends the set-point value C's, this set-point value corresponding to an air-heating configuration desired in the passenger compartment and relating to a desired temperature and speed of blown air. The calculating module CAL then receives this set-point value C's through its input.

The input through which the calculating module CAL receives the signal representative of the speed of the vehicle Vv is preferably linked to a speed computer of the vehicle, for example a meter which allows the driver to view the speed of the vehicle on the instrument panel. The calculating module CAL evaluates a speed of the outside air, as a function of the speed of the vehicle Vv.

In one more developed variant of the device according to the invention, the calculating module can receive a signal originating from an anemometer sensor. Thus, this signal is representative both of a wind incident on the vehicle and of the speed of the vehicle.

Provision is made, conventionally, to have available a sensor of the temperature Text of the air outside the vehicle. This sensor is linked to the calculating module CAL through one of the inputs which the device includes.

In the example described, a solar-flux sensor is provided, produced, for example, in the form of a photodiode or of an infrared sensor, arranged on the bodywork of the vehicle or behind a window of the vehicle in order to evaluate a solar flux Φs incident on the vehicle. This sensor is linked to an input which the device includes. However, in one variant according to which the windows of the vehicle are optically treated in order to filter the infrared radiation of incident solar flux (athermal surfaces), the influence of the solar flux Φs can be ignored in the regulation which the device according to the invention carries out, and such a solar-flux sensor can be dispensed with.

On the basis of these air-heating parameters (Vv, Text and Φs), of the set-point value C's and of the pre-existing settings of the various items of equipment of the installation, the calculating module CAL formulates a regulation set-point value REG and sends this regulation set-point value to a control module COM which the device according to the invention includes. In particular, the calculating module CAL evaluates a passenger-comfort temperature of the passenger compartment, according to the invention, as a function of the pre-existing settings of the equipment of the installation, of the abovementioned air-heating parameters and possibly of a further set-point value C's. The module CAL formulates the regulation set-point value REG, as a function of this comfort temperature, and forwards it to the control module COM.

The module COM controls the various items of equipment of the installation, as a function of the regulation set-point value REG and, to that end, includes a plurality of outputs linked to actuators for setting the various items of equipment of the installation. Thus, as a function of the regulation set-point value REG, the control module COM controls:

- the motor 1 of the blower of the installation (arrow C'v), with a view to controlling the speed Vas of the blown air;
- the heating radiator 7 (arrow C'c) of the hot-air branch 6, with a view to controlling the temperature Tc of the part of the airflow which flows in the hot-air branch 6;
- the air-conditioning loop (arrow C'f), with a view to adjusting the temperature Tf of the airflow which the evaporator 3 cools;
- the mixing flap 11 (arrow C't), with a view to adjusting the temperature Tas of the blown air; and
- the various distribution flaps 8A, 8B and 8C (arrow C'd), with a view to controlling the distribution of the airflow delivered in the passenger compartment.

The device comprises a memory MEM (FIG. 2) for storing the pre-existing set-point values for control of the various items of equipment of the installation.

In one variant, the device does not necessarily comprise a memory MEM. It is then equipped with at least one sensor, for example an infrared sensor, linked to the control module COM, while the calculating module CAL dynamically evaluates a comfort temperature Tco as a function of the measured magnitudes. In practice, a sensor can be provided for the interior temperature and/or a sensor turned towards the passenger's head (driver or other passenger). This variant exhibits the advantage of enhancing the quality of the regulation, by considering real conditions in the passenger compartment. On the other hand, the number of these sensors aggravates the cost of the installation.

The set-point values Cc, Cf and Ct make it possible to deduce the temperature Tas of the air intended to be blown into the passenger compartment (temperature of the air at the immediate outlet from the ducts 9A, 9B and 9C). The set-point value Cv makes it possible to deduce the speed Vas of the air intended to be blown. Finally, the set-point value Cd makes it possible to deduce the distribution of this airflow in the passenger compartment, particularly in at least one predetermined region of the passenger compartment.

Figure 5:
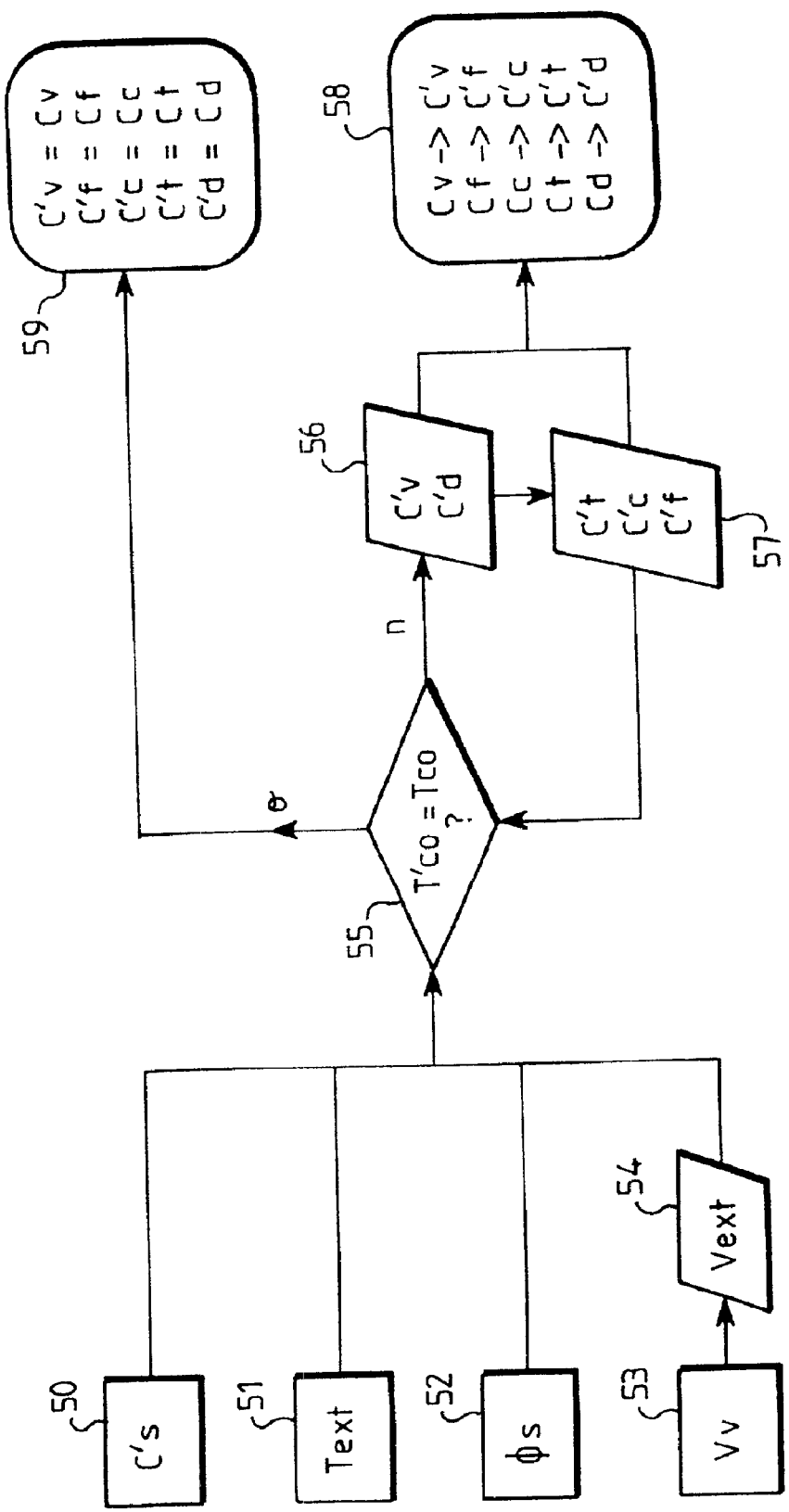
FIG. 5 is a flowchart on which appear various elements of the regulation which the control device carries out in a second embodiment of the invention.

Referring to FIG. 5, the calculating module receives the new values C's, Vv, Text and Φs, evaluates, according to a second embodiment, the comfort temperature for the passenger as a function of these new values and compares this new comfort temperature with a comfort temperature previously stored in memory of the device. If this difference is higher (in absolute value) than a predetermined threshold value, the calculating module sends a regulation set-point to the control module COM, which, on the basis of this regulation set-point, formulates new demand set-points for the various items of equipment of the installation, with a view to obtaining the newly estimated comfort temperature which corresponds to the air-heating configuration desired by the passenger.

Thus, the memory MEM works with the calculating module CAL to store the evaluated comfort temperature, so that the calculating module systematically estimates a variation between a newly evaluated comfort temperature and a memory-stored comfort temperature.

In the abovementioned variant (without the memory MEM), a current comfort temperature is measured dynamically, or calculated dynamically as a function of the latest measurements taken.

The control module COM adjusts, or does not adjusts, the operation of at least one of the items of equipment as a function of the estimated variation in the comfort temperature Tco (or of the current comfort temperature), with a view to maintaining a desired air-heating configuration in the passenger compartment, still corresponding to the new set-point received C's.

In the example described, the motor vehicle is equipped with an on-board computer OB (FIG. 2) equipped with the memory MEM and with a microprocessor $\mu$P, suitable for working with this memory MEM. In the example represented in FIG. 2, the on-board computer OB comprises a first input interface 21 which receives the set-point C's relating to the air-heating configuration desired by the passenger in the passenger compartment, as well as a second input interface 22, linked to sensors of the speed of the vehicle Vv, of the outside-air temperature Text and of solar radiation Φs. In practice, the on-board computer OB comprises a non-volatile memory (ROM memory), in which a computer program is recorded. The microprocessor $\mu$P can work with this non-volatile memory to execute a processing of the data stored in the memory MEM, with a view to estimating a comfort temperature Tco which corresponds to the newly recorded set-point Cs.

Such a computer program recorded in the non-volatile memory, working with the microprocessor, is to be considered as an important means for implementing the present invention. That being so, the present invention also envisages a computer program recorded on a medium other than that of a non-volatile memory of an on-board computer, this medium possibly being produced in the form of a diskette, of a CD-ROM, or else any other medium of this type. Such a computer program comprises a succession of instructions which make it possible to evaluate a comfort temperature as a function of the parameters stored in the memory MEM. Such a computer program is then intended to be recorded in a non-volatile memory, especially of a motor-vehicle on-board computer of the abovementioned type.

Figure 2:
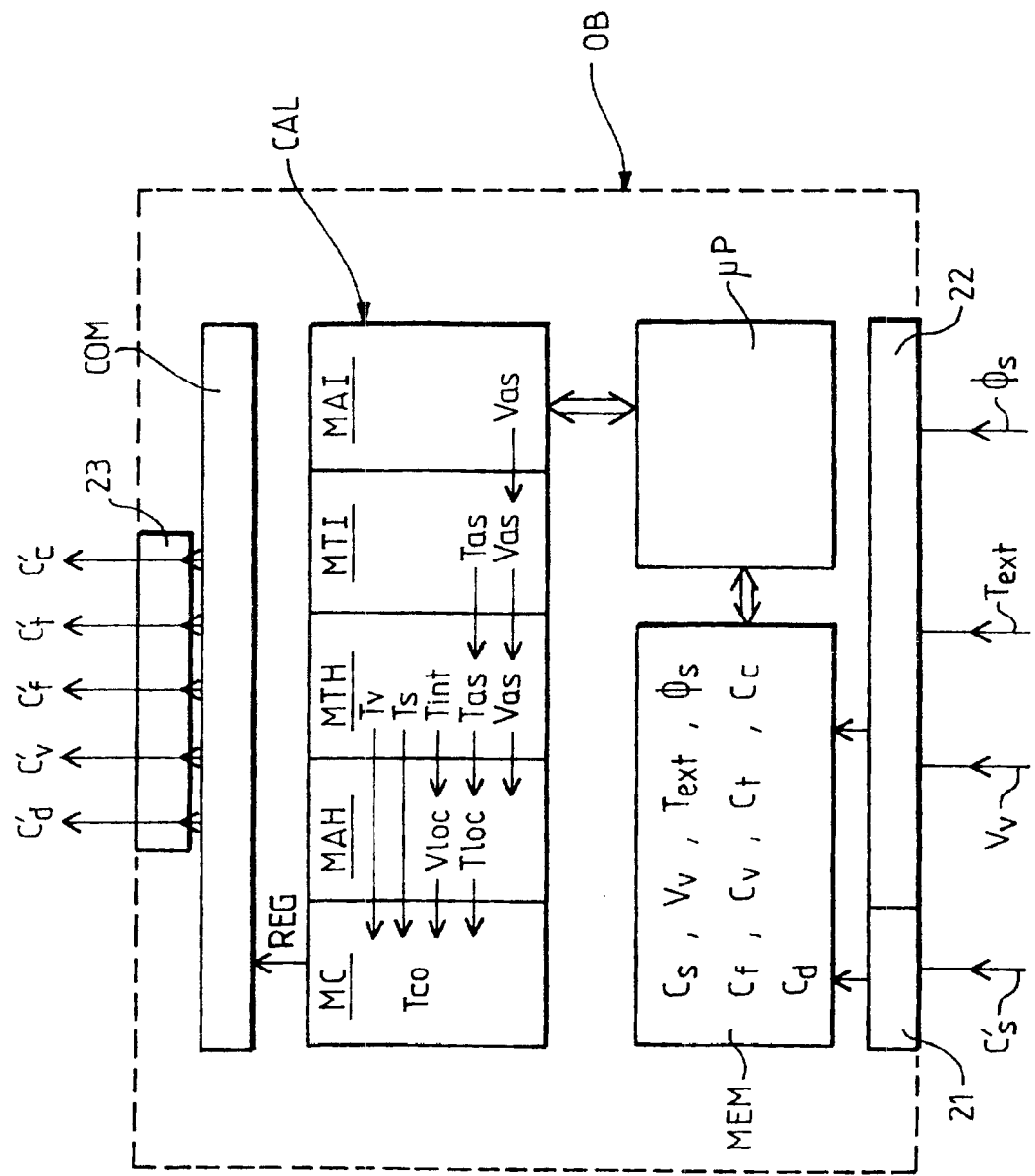
FIG. 2 diagrammatically represents the elements of a control device according to this preferred embodiment.

In the example represented in FIG. 2, the calculating module CAL is therefore presented in the form of a series of instructions stored in a non-volatile memory, suitable for working with the microprocessor $\mu$P of the on-board computer OB. By extension, the calculating module CAL from now on designates the computer program itself, making it possible to calculate the comfort temperature.

The calculating module CAL is subdivided into a plurality of successive modules MAI, MTI, MTH, MAH and MC, in which are evaluated, respectively:

- a speed of air intended to be blown into the passenger compartment Vas;
- a temperature of the air intended to be blown into the passenger compartment Tas;
- a temperature Tv of the windows of the vehicle, a temperature Ts of the structure of the vehicle and an average temperature Tint in the passenger compartment;

a temperature Tloc and a speed Vloc of the air blown into a predetermined region of the passenger compartment, in particular in proximity to the chest region of the driver of the vehicle (comprising the head and an upper part of the torso), in the example described; and the comfort temperature Tco corresponding to the air-heating configuration desired by the driver of the vehicle in this predetermined region (in proximity to his chest area).

The control module COM (taking the form, if appropriate, of a computer program recorded in a non-volatile memory of the abovementioned type and complementary to the program allowing calculation of the comfort temperature) works with the calculating module to receive the regulation set-point REG formulated as a function of the evaluation of the comfort temperature Tco. The module COM, if appropriate, formulates new control set-points C'd, C'v, C'f, C't and C'c of the various items of equipment of the installation, as a function of the regulation set-point REG, and sends them via an output interface 23 which the on-board computer OB includes.

In one preferred embodiment of the present invention, the calculating module of the device is configured to evaluate the comfort temperature Tco (or equivalent temperature) as follows.

Figure 3:
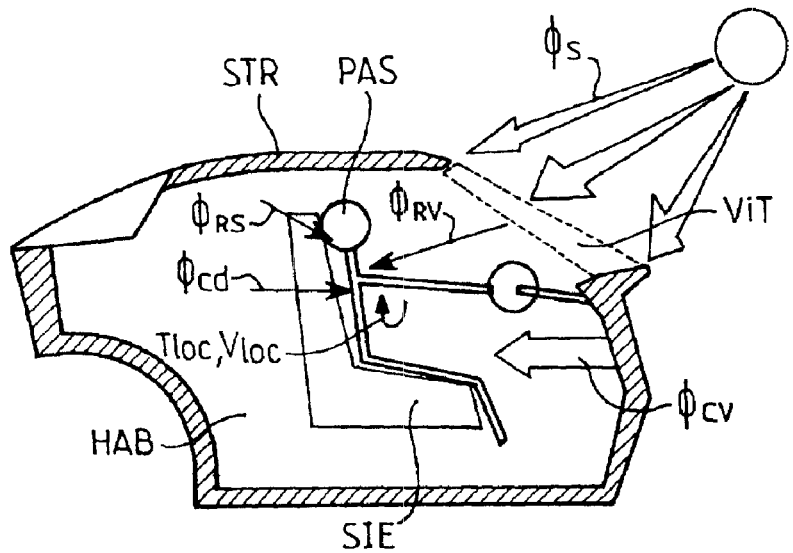
FIG. 3 diagrammatically represents various thermal exchanges by a passenger on board in a motor-vehicle passenger compartment, with his surroundings.

Referring to FIG. 3, a passenger in the passenger compartment of the vehicle receives heat by convection, by radiation and, if appropriate, by conduction. Generally, the heat which the passenger receives by conduction emanates from this passenger's seat SIE. In the example described, it is considered that the temperature of the seat is similar to that of the passenger, and that the flow of heat by conduction $\Phi_{cd}$ can be ignored.

The passenger PAS receives heat $\Phi_{RS}$, moreover, by radiation, arising from the structure STR of the vehicle (from the roof of the passenger compartment HAB and/or from the dashboard of the vehicle, for example). By radiation, the passenger PAS additionally receives heat $\Phi_{RV}$, emanating from the windows VIT of the vehicle. Typically, this heating by radiation can be induced especially by a solar flux $\Phi_S$ incident on the vehicle, in particular on its windows VIT and on its structure STR.

The passenger PAS of the vehicle finally receives heat $\Phi_{CV}$ by convection, this heat being due principally to an airflow circulating in the passenger compartment HAB. In particular, this airflow, in proximity to the chest area of the driver PAS, has a speed Vloc and a temperature Tloc.

In sum, the heat which the passenger PAS receives, ignoring the heat by conduction from the seat SIE, is given by:

$$\Phi_1 = \Phi_{RS} + \Phi_{RV} + \Phi_{CV} + t\Phi_S \quad (1)$$

where t represents a coefficient of transmission through the windows of the solar flux radiated into the passenger compartment HAB of the vehicle.

The heat given off by radiation from the structure is expressed:

$$\Phi_{RS} = Kst(Tint^4 - Ts^4) \quad (2)$$

where Ts represents the temperature of the structure STR of the vehicle and Kst represents a constant which can be deduced from the physical properties (especially the thermodynamic properties) of the region in question of the vehicle and of the surface.

In the same way, the heat given off by radiation from the windows is given by:

$$\Phi_{RV} = Kv(Tint^4 - Tv^4) \quad (3)$$

where Tv is the temperature of the windows and Kv is a constant which can be deduced from the physical properties (especially the thermodynamic properties) of the windows and of the surface of the region in question.

The temperatures Ts and Tv can be measured by sensors arranged on the bodywork of the vehicle, as appropriate, and on at least one window of the vehicle. In the example described, they are advantageously deduced from the outside temperature Text and from the heat by solar radiation $\Phi_S$, according to a chosen thermal model of the passenger compartment of the vehicle.

Finally, the heat given off by convection is given by:

$$\Phi_{CV} = k(Tint - Tloc) \quad (4)$$

where k is a convection coefficient which depends especially on the speed Vloc of air blown into a predetermined region of the passenger compartment, in which the exchanges of various types of heat are considered.

The convection coefficient k is conventionally given by:

$$k = a(Vloc)^{1/2} + b|Tloc - Tint|^{1/4} \quad (5)$$

where a and b are coefficients capable of being deduced from the physical properties of the aeration vents in the passenger compartment and from the distance separating the abovementioned predetermined region from these aeration vents.

Thus, for known respective geometries of the aeration vents and for a given region in the passenger compartment of the vehicle, the coefficients a and b are known.

The temperature Tint here represents the average temperature of the air within the passenger compartment. In the example described, the region of the passenger compartment in which the thermal exchanges are considered locally is that which surrounds the driver's head. As the skin of the driver's head is bare, it comes into contact directly with the surrounding air, and the average temperature to be considered is Tint. In contrast, if it is desired to estimate a comfort temperature in a localized region in proximity to a clothed part of the passenger PAS, a temperature of the clothing of this part of the passenger is taken into account. Thus, in the formulas given above, the temperature Tint becomes a clothing temperature which can be deduced from the temperature Tint and from the physical properties of the clothes which the passenger is wearing in this localized region. For example, in order to consider ventilation in a region close to the passenger's feet, account can be taken of the thermal properties of outerwear such as shoes and socks.

The average temperature Tint in the passenger compartment is estimated here according to a thermal model of the passenger compartment, described in the published French patent application FR-2779097 from the Applicant. In particular, it is deduced from the outside temperature Text and, as appropriate, from the measured solar flux $\Phi_S$. In a variant, it can be measured by an internal-temperature sensor. However, such a sensor should measure an average temperature, and should generally be ventilated during the temperature measures which it takes.

The temperature of the windows Tv and of the structure Ts is also deduced from a thermal model of the passenger compartment of this type.

The speed Vloc and the temperature Tloc of the air blown into the predetermined region of the passenger compartment is deduced from the temperature Tas and from the speed Vas of the air immediately at the outlets of the aeration vents of the passenger compartment, according to a chosen aerodynamic model of the passenger compartment. Such a model is described in detail in the same French patent application FR-2779097 from the Applicant.

In this context, the detailed description of this application FR-2779097 is to be considered as forming an integral part of the content of the description of the present application.

It should be noted, moreover, that the temperature Tas and the speed Vas of the air at the immediate exit from the aeration vents can be deduced from the physical properties of the installation and from the ducts which it includes, as well as from the respective settings of its various items of equipment.

In order to evaluate the comfort temperature Tco in the predetermined region of the passenger compartment, it is estimated that the heat which the passenger receives by convection, by radiation and, if appropriate, by conduction, is substantially equal to heat received by natural convection, in surroundings in which the forced speed of the air is negligible. This, needless to say, would be a virtual environment in which the passenger would be immersed and the temperature of which would correspond to the average interior temperature in the passenger compartment Tint. In such surroundings, the speed of the air would be created only by natural convection. This heat given off by natural convection is given by the relationship:

$$\Phi_2 = Kco(Tco-Tint) \qquad (6)$$

where Kco corresponds to a constant which depends especially on a coefficient of convection in these virtual surroundings, in which the speed of the forced air is zero, as well as on the surface of the region examined. This constant is given by the usual formulas for natural convection.

An estimate of the comfort temperature Tco is then obtained by setting the equation:

$$\Phi 1 - \Phi 2 = 0 \qquad (7)$$

Figure 4:
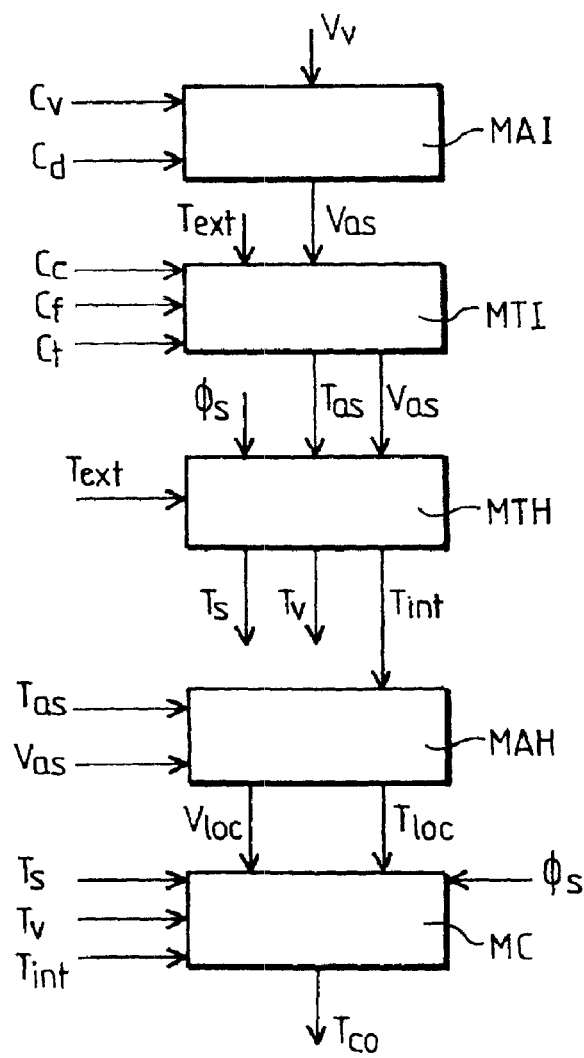
FIG. 4 is a flowchart on which appear the various models and the parameters used to evaluate the comfort temperature for the passenger, according to a particular embodiment of the invention.

In practice, the module MAI (FIG. 4) receives a value representative of the speed of the vehicle Vv. An outside airspeed is deduced from it. The module MAI moreover receives the demands corresponding to the existing settings of the motor of the blower 1 and of the position of the distribution flaps 8A, 8B and 8C. The two demand set-points Cv and Cd are therefore representative of the speed of the air which the installation delivers. In particular, on the basis of an aerodynamic model of the installation, the calculating module of the device according to the invention evaluates a blown-air speed Vas, in immediate proximity to an aeration vent of the passenger compartment.

Upstream of the evaporator 3, the installation receives outside air, at temperature Text. In passing over the evaporator, the heating radiator 7 and, if appropriate, an additional heating radiator, its temperature is altered. The module MTI then, according to a thermal model of the installation, evaluates a temperature Tas of blown air in immediate proximity to the abovementioned aeration vent, as a function of the outside temperature Text, of the speed Vas (in practice of the throughput) of the air blown by the installation and of the temperature-demand set-points of the various items of equipment of the installation. On the basis of the demand set-point Cf of the cold source (evaporator 3), of the demand set-point Cc of the hot source (heating radiator 7) and of the demand set-point Ct of the mixing (position of the mixing flap 11), a heat capacity of the installation is deduced. The module MTI, as a function of this heat capacity, of the outside temperature Text and of the blown-air speed Vas, thus estimates the blown-air temperature Tas, according to the chosen thermal model of the installation. In this model, certain physical properties (especially thermodynamic properties) of the installation (geometry of the ducts, compactness etc.) play a part.

The module MTH, according to a chosen thermal model of the passenger compartment, evaluates an average interior temperature Tint and the temperatures of structure Ts and of windows Tv. In the embodiment according to which a solar-flux sensor is provided, the module MTH uses the measured values of the solar flux $\Phi$s. It furthermore uses the measured values of the outside temperature Text, as well as the estimated values of the temperature Tas and of the speed Vas of the air blown by the installation.

The module MAH uses the estimated values of the average interior temperature Tint, of the temperature Tas of the blown air and of its speed Vas in order to evaluate the speed Vloc and the temperature Tloc of the air in the predetermined region of the passenger compartment, according to a chosen aerodynamic model of the passenger compartment, of the type described in the application FR-2779097.

The module MC receives the structure temperature Ts, the temperature of the windows Tv, the average interior temperature Tint, the temperature Tloc and the speed Vloc of the air in the predetermined region and, on the basis of the above formulas, evaluates a comfort temperature Tco in the predetermined region.

In the preferred embodiment represented in FIG. 5, it is checked, for every variation detected in any parameter, whether the calculated comfort temperature is altered. In the first place, acquisition is carried out of any new set-point C's (at 50) and of air-heating parameters chosen for the regulation, such as the outside temperature Text (at 51), the solar flux $\Phi$s (at 52) and the speed of the vehicle Vv (at 53), from which the outside airspeed Vext can be deduced (at 54). Next, the comfort temperature Tco is evaluated, and a test 55 is carried out on this calculated comfort temperature.

If the comfort temperature which corresponds to the set-point C's remains substantially the same as that previously calculated, the various demand set-points Cv, Cf, Cc, Ct and Cd remain unchanged (box 59).

In contrast, if the recently calculated value of the comfort temperature is different from that previously stored in memory (test 55), new demand set-points C'v and C'd are evaluated (at 56). The actual application of these new set-points C'v and C'd and/or the variation of the comfort temperature detected at 55 possibly requires new demand set-points C't, C'c and C'f to be evaluated (at 57). When the old comfort temperature stored in memory is recovered with new demand set-points C'v, C'd, C't, C'c and C'f (loop round test 55), these demand set-points are formulated and applied to the equipment of the installation. In the box 58, the old set-points Cv, Cd, Ct, Cc and Cf are therefore replaced by the newly calculated set-points C'v, C'd, C't, C'c and C'f in order to keep the same comfort temperature.

In practice, a test is provided (not represented in FIG. 5) on the set-point from the passenger C's. This test is carried out, for example, after acquisition of the set-point C's at 50. This is because, if the newly acquired set-point C's differs from the last set-point Cs stored in memory, then the acquired set-point C's is stored in memory MEM in place of the old set-point Cs and the calculating module evaluates the comfort temperature by taking account of the new set-point C's.

Figure 6:
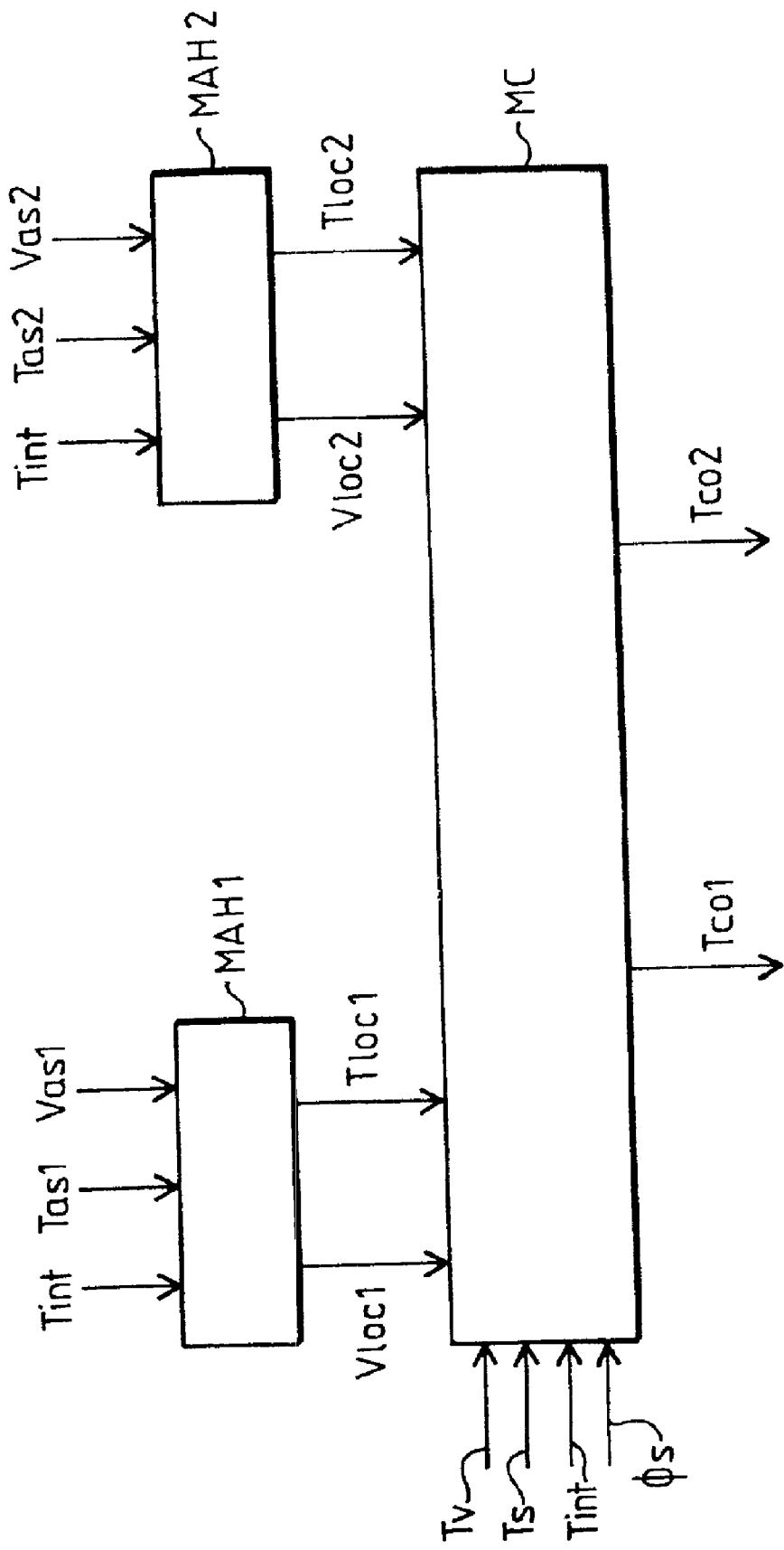
FIG. 6 is a flowchart on which appear chosen aerodynamic models of the passenger compartment and the parameters used to evaluate respective comfort temperatures at several regions of the passenger compartment, according to a preferred, more advanced, embodiment.

Referring now to FIG. 6, a device according to the invention is described, in a more developed embodiment, with regulation of the comfort temperature at two localized regions in the passenger compartment. The calculating module then comprises two modules MAH1 and MAH2 which receive temperatures Tas1 and Tas2 and speeds Vas1 and Vas2 respectively which, in this example of the installation of FIG. 1, depend on the distribution set-point Cd. The modules MAH 1 and MAH 2 are independently capable of evaluating a temperature Tloc1 and a speed Vloc1 in a first region of the passenger compartment (close to the driver's head, for example) and a temperature Tloc2 and a speed Vloc2 in a second region of the passenger compartment (for example in proximity to the driver's feet), respectively. On the basis of these temperature and speed values, as well as of the estimated air-heating parameters Tv, Ts, Tint and measured parameter $\Phi$s, the module MC evaluates the two comfort temperatures Tco1 and Tco2 in the first region and in the second region, respectively. If the first region is regarded as being in proximity to the driver's head, the estimate of the comfort temperature Tco1 is based on the interior temperature Tint, directly. In contrast, if the second region is regarded as being close to the driver's feet, the calculation of the comfort temperature Tco2 may advantageously be based on a clothing temperature, for example proportional to the interior temperature Tint.

If one of the comfort temperatures Tco1 varies, while the other comfort temperature Tco2 remains substantially constant, a new demand set-point C'd can be provided especially for the respective positions of the distribution flaps 8A, 8B and 8C.

It should be noted that provision can be made, moreover, for regulation for two distinct zones of the passenger compartment, for example a front zone and a rear zone or a left-hand zone and a right-hand zone. In this embodiment, the device receives two set-points from the passengers C's1 and C's2 relating to air-heating configurations desired in two respective regions of the passenger compartment. In the installation, ducts are provided for distributing air into these two zones. Preferably, an additional hot source and possibly a blower, which are individual to each zone, may furthermore be provided, with or without at least one mixing flap. The module MC still takes account of the local temperatures Tloc1, Tloc2 and of the local speeds Vloc1 and Vloc2 of the air in each of the two zones in order to evaluate each comfort temperature in the corresponding zone.

Thus, regulation of the operation of the various items of equipment of the installation, based on the estimate of a variation in the comfort temperature, makes it possible, according to one of the major advantages which the present invention procures, to take account directly of the heat sensed by the passengers. According to another advantage which the present invention procures, the estimating of such a comfort temperature in the localized regions of the passenger compartment makes it possible to take account of the clothing of the passengers depending on the various regions considered, or else depending on the various air-heating configurations desired by the passengers in the passenger compartment, in particular if the installation allows distribution of air into different zones of the passenger compartment in each of which a passenger is situated.

Needless to say, the present invention is not limited to the embodiment described above by way of example. It extends to other variants.

Thus it will be understood that, in a simplified variant, the abovementioned additional heating radiator and/or the air-conditioning loop described above can be dispensed with. However, such an additional heating radiator is generally used for low outside temperatures, typically when the radiator 7 is insufficient. The demand set-point Cc is then adjusted, in such circumstances, as a function of the estimated comfort temperature. The demand set-point Ct may, at least in a first stage, remain constant and correspond to a position of the mixing flap 11 in which it closes the cold-air branch 5. Conversely, for high outside temperatures, the demand set-point Cf can be adjusted to set the operation of the air-conditioning loop, while the demand set-point Ct remains substantially constant and corresponds to a position of the mixing flap 11 in which it closes the hot-air branch 6.

The operation of the air-conditioning loop can be further used to reduce the level of humidity of the air in the passenger compartment, for example in order to prevent mist forming on the windows of the vehicle. The water vapor present in the air which passes through the evaporator condenses and can thus be disposed of outside the passenger compartment. In this case, the module COM simultaneously drives the air-conditioning loop, the mixing flap and, if appropriate, the additional heating radiator. A supplementary input can then be provided, moreover, in the device according to the invention, this input receiving a signal relating to information representing a degree of humidity in the passenger compartment. The control module formulates demand set-points C'f, C't and possibly C'c in order simultaneously to adjust the blown-air temperature Tas and to maintain the level of humidity in the passenger compartment below a threshold value.

Provision can be made, moreover, especially in the thermal model of the passenger compartment described above, to take account of the metabolic activity of the passengers present in the vehicle. For example, as a function of the number of doors opened when the vehicle is started up, or else on the basis of information delivered by presence sensors mounted on the seats of the vehicle, an average heat dissipation can be deduced, by the metabolism of the passengers, with a view to improving the estimate of the average interior temperature in the passenger compartment.

Taking account of the solar radiation for estimating the comfort temperature and/or in the thermal model of the passenger compartment which are described above, although advantageous, may, in a simplified variant, be dispensed with. In this variant, the device according to the invention is then linked to only two sensors, at least, including an outside-temperature sensor and a speed sensor (speed meter).

In a variant embodiment of the device described above, a clock can be provided, capable of working with the inputs of the device, as well as with the memory MEM, for the purpose of comparing the set-point Cs and the recorded parameters Vv, Text and $\Phi$s with new values C's, Vv, Text and $\Phi$s received. In fact, in the memory of the device, may be stored the set-point originating from the passenger Cs, values representative of the air-heating parameters such as the speed of the vehicle Vv, the outside temperature Text and the solar flux $\Phi$s. Thus, after a predetermined duration (for example of two minutes), the calculating module compares the new values received as input with the values Cs, Vv, Text and $\Phi$s stored in memory.

What we claim is:

1. A device for controlling an installation for heating, ventilating and/or air-conditioning a passenger compartment of a motor-vehicle, the device comprising:

a first input provided for receiving a set-point value related to an air-heating configuration desired in the passenger compartment;

a second input for receiving at least one signal representative of an air-heating parameter, an output linked to at least one actuator for controlling settings of the installation; and a control module connected to the first and second inputs and the output, the control module provided for controlling the at least one actuator as a function of at least one comfort temperature that corresponds to a desired air-heating configuration in the at least one predetermined region of the passenger compartment;

the control module including a calculating module for estimating at least one comfort temperature for a passenger situated in at least one predetermined region of the passenger compartment;

the calculating module including means for estimating a blow-in temperature and a blow-in speed of the air which a blower of the installation blows into the passenger compartment as a function of the first and second inputs according to aerodynamic and thermal models of the passenger compartment;

the calculating module further including means for evaluating an average temperature within the passenger compartment based on the blow-in temperature and the blow-in speed of the air blown into the passenger compartment and the air-heating parameter according to the thermal model;

the calculating module further including means for evaluating a temperature and a speed of air in at least one predetermined region of the passenger compartment based on the blow-in temperature and the blow-in speed of the air blown into the passenger compartment and the average temperature within the passenger compartment according to the aerodynamic model;

the calculating module further including means for determining the at least one comfort temperature as a function of the average temperature within the passenger compartment and the temperature and the speed of air in the at least one predetermined region of the passenger compartment.

2. The device of claim 1, wherein the air-heating parameter is at least one of a temperature outside the passenger compartment, a vehicle speed and a solar flux incident on the vehicle.

3. The device of claim 1, wherein the calculating module further including means for evaluating the at least one comfort temperature as a function of a temperature of at least one structural element.

4. The device of claim 3, wherein the temperature of the at least one structural element is evaluated as a function of the blow-in temperature and of the blow-in speed of the air blown into the passenger compartment and the air-heating parameter.

5. The device of claim 3, wherein the second input is suitable for receiving respective signals representative of a temperature and of a speed of the air which the installation blows into the passenger compartment and wherein the calculating module is configured according to a chosen thermal model of the passenger compartment to evaluate the average interior temperature in the passenger compartment as a function of the temperature and of the speed of the blown air, wherein the second input is provided for receiving a signal representative of an outside-air temperature, and the calculating module estimates the interior temperature based on the outside-air temperature in the thermal model of the passenger compartment, and wherein the calculating module is configured to evaluate the temperatures of the structural element of the vehicle as a function of the temperature and of the speed of blown air and the outside temperature and of the solar flux.

6. The device of claim 3, wherein the second input is provided for receiving respective signals representative of a temperature and of a speed of the air which the installation blows in passenger compartment and wherein the calculating module is provided to evaluate the average interior temperature in the passenger compartment as a function of the temperature and the speed of the blown air based on a chosen model of the passenger compartment, wherein the second input is provided for receiving a signal representative of solar flux incident on the vehicle, and the calculating module uses the solar flux in the thermal model of the passenger compartment for evaluating the interior temperature, and wherein the calculating module is configured to evaluate the temperature of the at least one structural element of the vehicle as a function of the temperature and of the speed of blown air, of the outside temperature and of the solar flux.

7. The device of claim 1, wherein the installation further includes at least one distribution flap for distributing the airflow in the passenger compartment, and wherein the calculating module is configured to evaluate the blow-in-air speed as a function of an outside air speed, a rotational speed of the blower and position of the at least one distribution flap.

8. The device of claim 7, wherein the calculating module is configured to estimate the outside air speed as a function of the speed of the vehicle.

9. The device of claim 1, wherein the calculating module is configured to evaluate the blow-in temperature as a function of the blow-in speed, a temperature of hot air delivered into the passenger compartment from a hot-air source of the installation and the temperature outside the passenger compartment.

10. The device of claim 9, wherein the hot-air source comprises a radiator traversed by a heat-exchange fluid, and wherein the calculating module is further configured to evaluate the hot-air temperature as a function of a throughput of the fluid flowing through the radiator.

11. The device of claim 9, wherein the installation further includes a mixing flap with adjustable position for adjusting the blown-in air temperature, the second input is further provided for receiving a signal representative of the position of the mixing flap, and wherein the calculating module is configured to evaluate the blown-in air temperature as a function of the position of the mixing flap.

12. The device of claim 9, wherein the installation moreover includes a cold-air source, and wherein the calculating module is configured to evaluate the blown-in air temperature based on a temperature of air coming from the cold-air source.

13. The device of claim 12, wherein the cold-air source is an air-conditioning loop traversed by a cooling fluid at variable pressure in order to adjust the cold-air temperature, and wherein the temperature of air coming from the cold-air source is representative of the pressure of the cooling fluid.

14. The device of claim 1, further comprising a memory for storing the set-point value, wherein the second input is linked to the memory in order to store a value representative of the air-heating parameter and wherein the calculating module is provided for working with the memory in order to evaluate the at least one comfort temperature.

15. The device of claim 14, wherein the calculating module is able to work with the memory and the second input in order to estimate a variation in the air-heating parameter, and/or in the set-point, while the control module is configured to adjust or not adjust the operation of the equipment as a function of at least one estimated variation in the air-heating parameter and/or in the set-point, with a view to maintaining a comfort temperature which corresponds to the desired air-heating configuration in the passenger compartment.

16. The device of claim 14, wherein the memory is able to work with the calculating module in order to store the evaluated comfort temperature, and wherein the calculating module is configured to estimate a variation between an evaluated comfort temperature and a memory-stored comfort temperature, while the control module (COM) is configured to adjust or not adjust the operation of the equipment as a function of the estimated variation in the comfort temperature, with a view to maintaining a desired air-heating configuration in the passenger compartment.

17. The device of claim 1, wherein the calculating module is able to dynamically evaluate the comfort temperature, while the control module is configured to dynamically alter the operation of the equipment, as a function of the currently evaluated comfort temperature.

18. The device of claim 1, wherein, with the installation further includes an air-distribution device for distributing the blown air among a plurality of regions of the passenger compartment, the calculating module is provided to evaluate a comfort temperature in each of the regions and the control module is provided to modify operation of the distribution device as a function of the comfort temperature.

19. The device of claim 1, wherein the
 a first input is provided for receiving the set-point value relating to the desired air-heating configuration in the passenger compartment and a plurality of set-point values relating to desired air-heating configuration in corresponding plurality of predetermined region of the passenger compartment,
 wherein the calculating module is provided to evaluate the comfort temperature based on the air-heating parameter and the set-point values.
 wherein the installation further includes an air-distribution device for distributing the air among the plurality of regions of the passenger compartment,
 wherein the calculating module is configured to evaluate a comfort temperature in each of the regions,
 wherein the control module is configured to control the distribution device as a function of the comfort temperatures,
 and wherein the calculating module is configured to evaluate the comfort temperature for each of the regions based on the set-point values.

20. A method for controlling an installation for heating, ventilating and/or air-conditioning a passenger compartment of a motor vehicle, the method comprising the steps of:
 providing a first input representative of a set-point value related to an air-heating configuration desired in the passenger compartment;
 providing a second input representative of an air-heating parameter; estimating a blow-air temperature and a blow-in speed of the air blown into the passenger compartment as a function of the first and second inputs according to aerodynamic and thermal models of the passenger compartment;
 evaluating an average temperature within the passenger compartment based on the blow-in temperature and the blow-in speed of the air blown into the passenger compartment and the air-heating parameter according to the thermal model;
 evaluating a temperature and a speed of air in at least one predetermined region of the passenger compartment based on the blow-in temperature and the blow-in speed of the air blown into the passenger compartment and the average temperature within the passenger compartment according to the aerodynamic model;
 determining at least one comfort temperature as a function of the average temperature within the passenger compartment and the temperature and the speed of air in the at least one predetermined region of the passenger compartment; and
 operating at least one actuator for controlling settings of the installation as a function of the at least one comfort temperature that corresponds to a desired air-heating configuration in the at least one predetermined region of the passenger compartment.

* * * * *